United States Patent
Ridgeway

(10) Patent No.: US 9,321,393 B2
(45) Date of Patent: Apr. 26, 2016

(54) LOAD SECURING WALL SYSTEM

(71) Applicant: Howard Ridgeway, Maple Heights, OH (US)

(72) Inventor: Howard Ridgeway, Maple Heights, OH (US)

(73) Assignee: H.R.T. II, LLC, Maple Heights, OH (US)

( * ) Notice: Subject to any disclaimer, the term of this patent is extended or adjusted under 35 U.S.C. 154(b) by 0 days.

(21) Appl. No.: 13/839,040

(22) Filed: Mar. 15, 2013

(65) Prior Publication Data

US 2014/0271022 A1    Sep. 18, 2014

(51) Int. Cl.
*B60P 7/08* (2006.01)
*B60P 7/14* (2006.01)

(52) U.S. Cl.
CPC ........................................ *B60P 7/14* (2013.01)

(58) Field of Classification Search
CPC ........................................................ B60P 7/14
USPC ............. 410/46, 94, 118, 120–124, 126–128, 410/154, 155; 108/27, 55.1, 55.3, 57.25, 108/57.27; 248/351
See application file for complete search history.

(56) References Cited

U.S. PATENT DOCUMENTS

| | | | |
|---|---|---|---|
| 1,142,088 A | 6/1915 | Greene | |
| 3,315,800 A * | 4/1967 | Wagner | |
| 3,685,460 A | 8/1972 | Steele, Jr. et al. | |
| 4,068,599 A | 1/1978 | Sapp et al. | |
| 4,147,112 A | 4/1979 | Green et al. | |
| 4,317,645 A | 3/1982 | Van Gompel | |
| 4,434,970 A | 3/1984 | Boland et al. | |
| 4,465,413 A | 8/1984 | Petren | |
| 4,756,651 A | 7/1988 | Van Gompel et al. | |
| 4,799,840 A | 1/1989 | Van Gompel et al. | |
| 4,801,228 A | 1/1989 | Van Gompel | |
| 4,815,905 A * | 3/1989 | Garcia, Jr. ..................... | 410/128 |
| 4,901,650 A | 2/1990 | Armstead | |
| 5,219,251 A | 6/1993 | Kanczuzewski | |
| 5,269,639 A | 12/1993 | Ryder, Jr. | |
| 5,597,084 A | 1/1997 | Parasin | |
| 5,636,951 A | 6/1997 | Long et al. | |
| 5,636,952 A | 6/1997 | Richardson | |
| 5,934,850 A | 8/1999 | Soumar et al. | |
| 5,971,685 A | 10/1999 | Owens | |
| 5,988,962 A | 11/1999 | Santa Cruz et al. | |
| 5,997,228 A | 12/1999 | Potter | |
| 6,042,312 A | 3/2000 | Durham, II | |
| 6,068,433 A | 5/2000 | Baloga | |
| 6,238,154 B1 | 5/2001 | DaPrato | |
| 6,408,768 B1 | 6/2002 | Giampavolo et al. | |
| 6,599,070 B1 | 7/2003 | Stedman et al. | |
| 7,717,657 B2 | 5/2010 | Clarke | |
| 7,954,903 B2 | 6/2011 | Muldoon | |
| 7,997,213 B1 | 8/2011 | Gauthier et al. | |
| 2006/0118456 A1 | 6/2006 | Macasaet et al. | |
| 2010/0308622 A1 * | 12/2010 | Endo | |

* cited by examiner

*Primary Examiner* — Stephen Gordon
(74) *Attorney, Agent, or Firm* — Hahn Loeser + Parks LLP

(57) ABSTRACT

This invention relates to securing palletized materials, and more specifically, to creating a temporary wall system for securing palletized materials placed in vehicles for transport. The temporary wall system allows for an unsecured side of a palletized load to be secured in a quick and easy fashion, to prevent movement and shifting of the load during transport. The wall system may include a panel member having a predetermined height and width, with engagement feet securing the wall system in association with an individual pallet of palletized materials. The panel member may further include at least one restraint receiving system. In examples, a hanging system allows for effective storage when not in use.

20 Claims, 5 Drawing Sheets

LOAD SECURING WALL SYSTEM

BACKGROUND

In the transportation and storage of materials, one cost effective system uses palletized loads that facilitate handling and storage. Palletized loads may include boxes, equipment, goods, materials and many other materials and/or goods. Palletized materials are generally transported in trucks, but may also be transported in other vehicles or manners. It is common that the palletized materials come in many different sizes and shapes. These palletized materials are often secured on individual pallets in boxes and/or by shrink-wrap. When transported, each individual pallet with palletized materials are typically stacked along-side and/or on top of one another. Commonly, in a transporting vehicle, such as a tractor trailer, the individual pallets with palletized materials are arranged side by side to attempt to secure each of the loads from movement during transport by constraining each pallet via the side walls of the trailer and the adjacent pallets. But, it is often the case that there are unsecured palletized materials. This may be due to not having enough individual pallets with palletized materials to fill the transporting vehicle in its entirety and/or pallets of different sizes or shapes. Due to forces incurred during transport, many times, such unsecured palletized loads spill, causing safety concerns and loss of product for example. A person transporting the material must go to extensive means to attempt to secure any unsecured pallets. One device directed to attempting to secure such unsecured pallets is a load bar, which is extended between the wall of the trailer and a small pad engages a point on the palletized load.

SUMMARY

This invention relates in general to securing palletized materials, and more specifically, to creating a temporary wall system for securing palletized materials placed in vehicles for transport. The temporary wall system allows for an unsecured side of a palletized load to be secured in a quick and easy fashion, to prevent movement and shifting of the load during transport. The wall system may be cost effectively constructed of plastic, such as through a blow molding process. In at least one embodiment, the wall system may be made of material durable enough to secure an individual pallet of palletized material, flexible enough to absorb movement in transport, and light enough for a single person to handle on their own. The wall system comprises a panel member having a predetermined height and width, with engagement feet securing the wall system in association with an individual pallet of palletized materials. The panel member further includes at least one restraint receiving system. In examples, a hanging system allows for effective storage when not in use.

In an example, the invention may facilitate securing individual pallets with palletized materials interfacing the at least one restraint receiving system with a load bar, to force the panel member against a free side of the unsecured load. The wall system may comprise of pre-molded restraint receiving system that will engage and retain the load bars in position. The pre-molded restraint receiving system may be constructed to engage the load bar at an angle to provide enhanced support to the palletized load. For example, the arrangement may allow a load bars to extend from the wall system secured to a standard sized individual pallet with palletized material to an inside corner of a load space in a transport vehicle or trailer. Alternatively, the pre-molded inserts may engage load bars that extend to adjacent materials or even another wall system, thus allowing use to secure loads in many applications and environments.

In an example, a plurality of restraint receiving systems are provided at different heights on the panel member. This may allow use of a higher restraint receiving system to secure an individual pallet with materials stacked high, by ensuring that the force applied to the panel member is at a higher point on the palletized materials to prevent shifting. A lower restraint receiving system may be used in addition to an upper one, to apply more restraining force against the palletized goods, or may be used to secure individual pallet with materials stacked low, thus placing force upon and securing material that is placed lower on a pallet from shifting. Other restraint receiving systems may be used or multiple wall systems may be used to effectively secure a palletized load.

DETAILED DESCRIPTION

Figure 1:
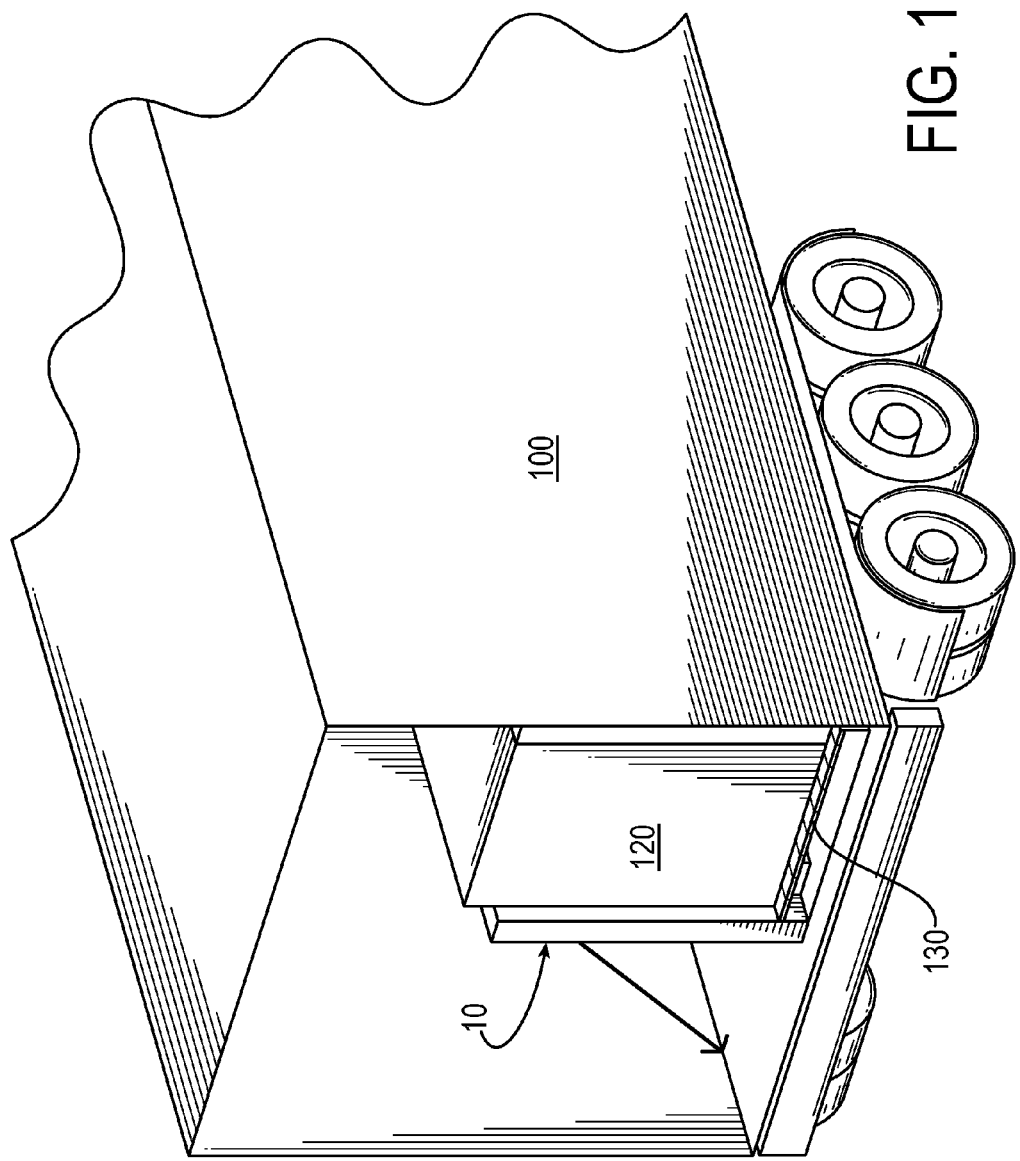
FIG. 1 is a partial elevational view of a securing wall system according to an example of the invention in use.
Figure 2:
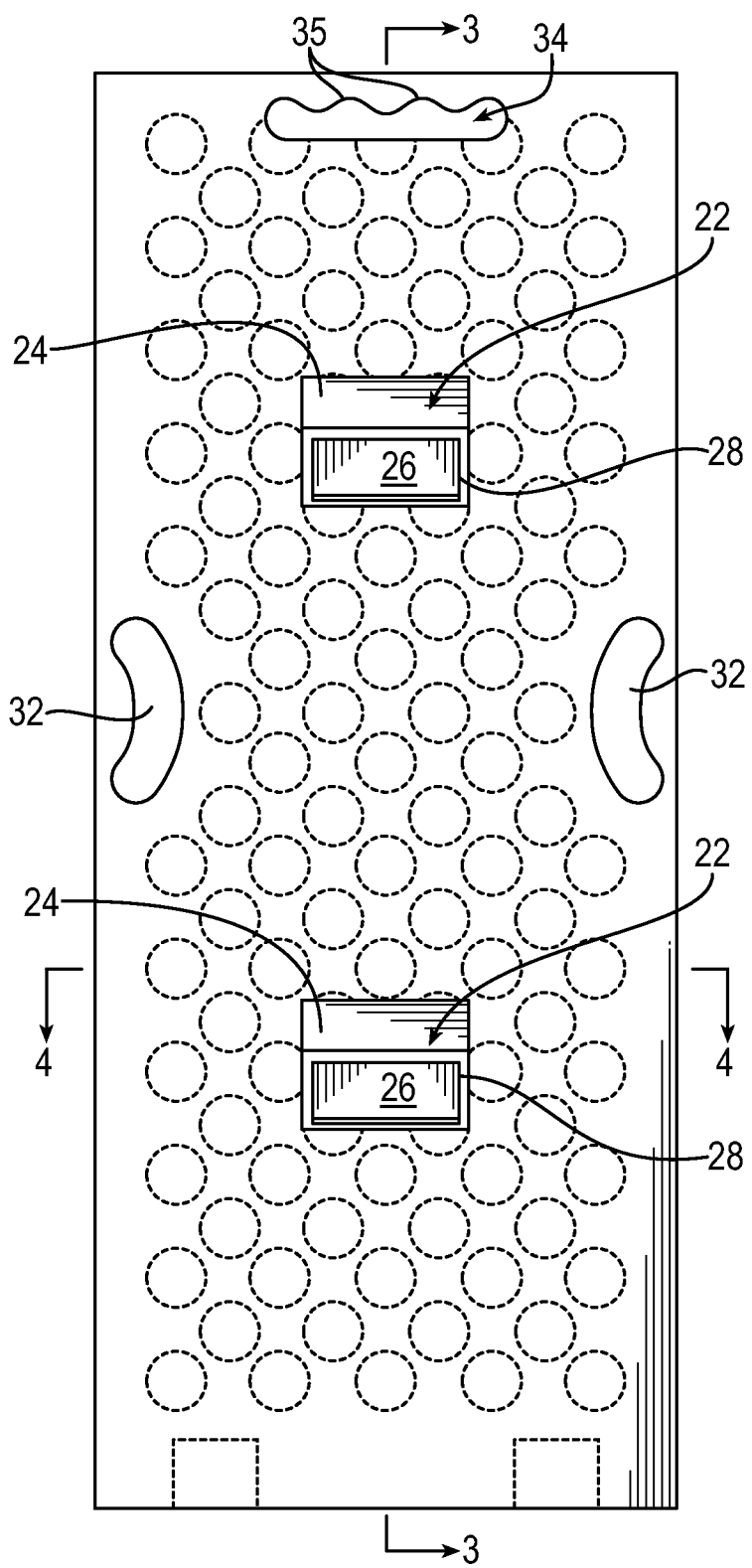
FIG. 2 is a front view of an example load securing wall system.

Referring to FIG. 1, an example of a load securing wall system 10 according to the invention is shown in use with a trailer 100. In exemplary uses, the load securing wall system 10 may be used for securing materials 120 stacked on pallets 130 utilized for transport in mobile vehicles or trailers 100. The securing wall system 10 is structured to receive and retain load bars 60 to apply force against an unsecured side of materials 120 on pallet 130. These load bars 60 securely engage the load securing wall system 10 and extend from an opposite wall of the vehicle or trailer 100 or other surfaces or palletized loads as may be desired. It should be recognized that while the mobile vehicle or trailer 100 is illustrated as a semi trailer, the mobile vehicle or trailer 100 may be any chosen mobile vehicle or trailer, such as, but not limited to, trucks, vans, trains, ships, containers and the like.

With reference to FIGS. 2-5, the securing wall system 10 may be made to one or more standard sizes for securing palletized materials. The wall system 10 includes a panel member 12 having a predetermined width, height and thickness. For example, the width of the panel member 12 may extend substantially the width of any standard sized pallets, or a predetermined percentage of any standard sized pallets. For example, the width may be chosen to be between 50 and 100 percent of the pallet size. The height of the panel member 12 may be substantially the height of the palletized goods positioned on a pallet, or a predetermined percentage of this height. For example, the height may be chosen to be between 50 and 100 percent of the height of the palletized goods positioned on a pallet. If desired, the height may extend nearly as high as the inside dimension of a standard mobile vehicle or trailer 100 used in logistics. The thickness of the panel member 12 may be several inches and the wall system 10 may be formed of a durable plastic material with wall thicknesses to provide significant rigidity to the wall system 10. In general, the strength or rigidity of the wall system 10 is sufficient to counter forces applied by a palletized load during transport where forces during transportation can be significant during vehicle turning, braking, accelerating and the like. The material may also allow for some amount of flexibility to tend to absorb forces from the palletized load. The wall system 10 is also light enough for a single person to easily maneuver and use. In an example, the wall system 10 may be blow molded for cost-effective manufacture.

Figure 3:
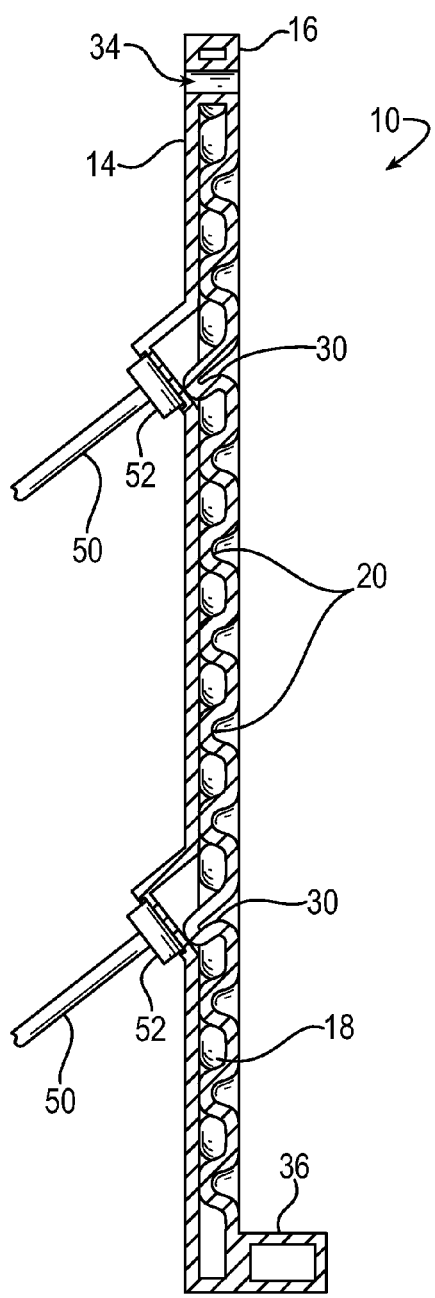
FIG. 3 is a vertical sectional view along line 3-3 of FIG. 2.
Figure 4:
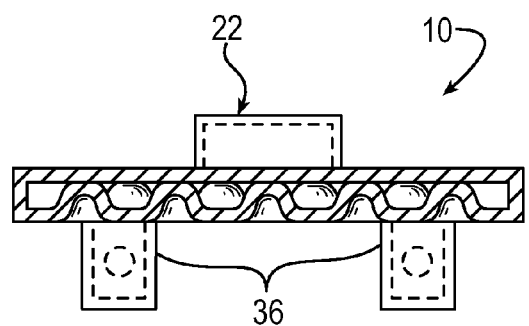
FIG. 4 is a horizontal sectional view along line 4-4 of FIG. 2.
Figure 5:
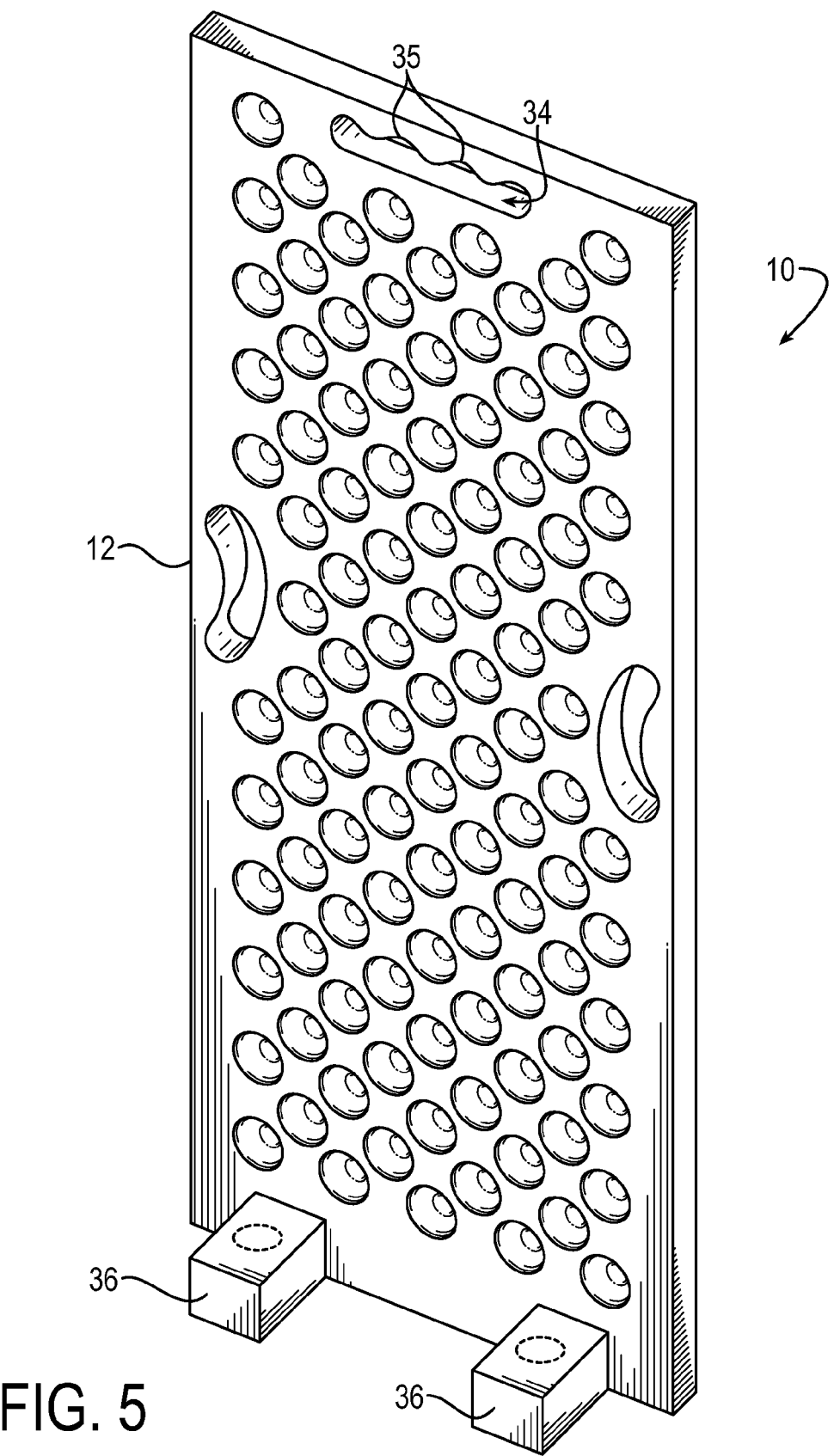
FIG. 5 is an elevational view of the back side of an example load securing wall system.

As best shown in FIGS. 3 and 4, the panel member 12 includes a first wall 14 and a second wall 16 forming a hollow core area 18. A plurality of bosses or reinforcing structures 20 may be formed in the second wall 16 to extend into engagement with the first wall 14 or into a position extending toward the first wall 14. The bosses 20 facilitate providing desired rigidity to the entire securing wall structure 10 and reduce the weight of the plastic blow molded load securing wall system 10. In association with the first side 14, at least one restraint receiving system 22 is provided, and may be positioned along a center line of the width of the panel member 12, or may be offset at one or both sides of the first wall 14. In the example shown, a plurality of restraint receiving systems 22 are provided, with a first at an upper portion of the first wall 14 and a second at a lower portion of first wall 14. Providing a plurality of restraint receiving systems 22 at different heights on the panel member 12 may allow use of a higher restraint receiving system 22 to secure an individual pallet with materials stacked high, by ensuring that the force applied to the panel member is at a higher point on the palletized materials to prevent shifting. A lower restraint receiving system 22 may be used in addition to an upper one, to apply more restraining force against the palletized goods, or may be used separately to secure a palletized load with materials stacked low, thus placing force upon and securing material that is placed lower on a pallet from shifting. Other restraint receiving systems 22 may be used or multiple wall systems 10 may be used to effectively secure a palletized load. The restraint receiving systems 22 may comprise a housing 24 with an angled support surface 26. Around the angled support surface 26, there may be provided a ridge portion 28 extending away from at least two sides of the angled support surface 26 or around all sides thereof. The ridge portion 28 will cause a support member positioned against the support surface 26 to be retained on support surface 26 without the possibility of sliding off surface 26. The housing 24 and angled support surface 26 may be strengthened by making these portions thicker, or a boss 30 may be formed to support the surface 26. In manufacturing the wall system 10 having restraint receiving systems 22, the angled surface 26 may be formed using a hydraulic cylinder which is actuated to form the restraint receiving systems 22 during the plastic blow mold forming process. In this example, the surface 26 is angled such that a securing member, such as a load bar, may be used to engage the surface 26 and force the wall system 10 against a palletized load. The restraint receiving systems 22 boss 30 may be formed at an angle that provides support in the same plane as the force being distributed against the surface 26. Upon positioning one or more load bars 50 or other force applying member, a pad 52 of the load bar 50 will engage the pre-molded load bar inserts or restraint receiving systems 22 on the engagement surface 26 that is recessed into these pre-molded load bar inserts or restraint receiving systems 22. This engagement surface 26 is recessed deep enough to securely engage and retain the load bar pad 52 and prevent the load bars 50 from separating and disengaging from the engagement surface 26.

In the wall system 10, there may also be provided handle members 32, which allow for easy handling and positioning of the wall system 10 against a palletized load or for storage when not being used. The hand grips 32 may be located on the wall system 10 in a manner that allows the individual handling the wall system 10 to support the wall system 10 at about its center of gravity. The hand grips 32 apertures may be curved to fit one's hand. Additionally, the hand grips 32 apertures may be formed with finger contours to fit one's hand. The hand grips 32 allow a single individual to easily handle the wall system 10, and position the wall system 10 for use against a side of a palletized load. Another aperture 34 may be provided near the top of wall system 10 to allow hanging of the wall system 10 on a hook or the like. The aperture 34 provides a hanging system that allows for effective storage when not in use, as will be described hereafter.

The wall system 10 may further include at least one foot member 36 extending from the bottom portion of the wall system 10 from the second side 16. The feet 36 are dimensioned and positioned to allow for extending into a side portion of a pallet to provide support that opposes vertical movement of the wall system upon securing palletized materials stacked on pallets with the load securing wall system 10 and corresponding load bars 50. The feet 36 will extend into standard openings on pallets much like forks on a fork-lift truck or pallet jack. The feet 36 will extend far enough into the opening in a pallet to prevent disengagement from the pallet during transport. Upon positioning of a load bar 50 in engagement with a restraint receiving system 22, the wall system 10 will be forced upwardly due to the angled support surface 26, and the feet 36 will engage the pallet within the opening. The feet 36 may additionally be constructed to be thicker or to include bosses or the like to provide rigidity. In the example shown, two feet 36 uniformly distribute forces to maintain the wall system in engagement with a palletized load.

The wall system 10 may include a hanging system comprising hole 34, that allows for a plurality of wall systems 10 to be hung adjacent one another. When not in use, the wall members 10 are conveniently stored by hanging via the hole 34. The hole 34 may be formed as an elongated aperture with recessed slots 35 intermittently formed on top of hole 34. The recessed slots 35 allow the feet 36 of adjacent wall systems 10 to be displaced from one another, to thereby allow hanging of a plurality of wall members 10 in a somewhat flat orientation. When hanging a wall system 10, the slots 35 allow the user to choose which slot will be used on a hook or support member to displace the feet 36 thereof from the feet of an adjacent wall member 10.

Figure 6:
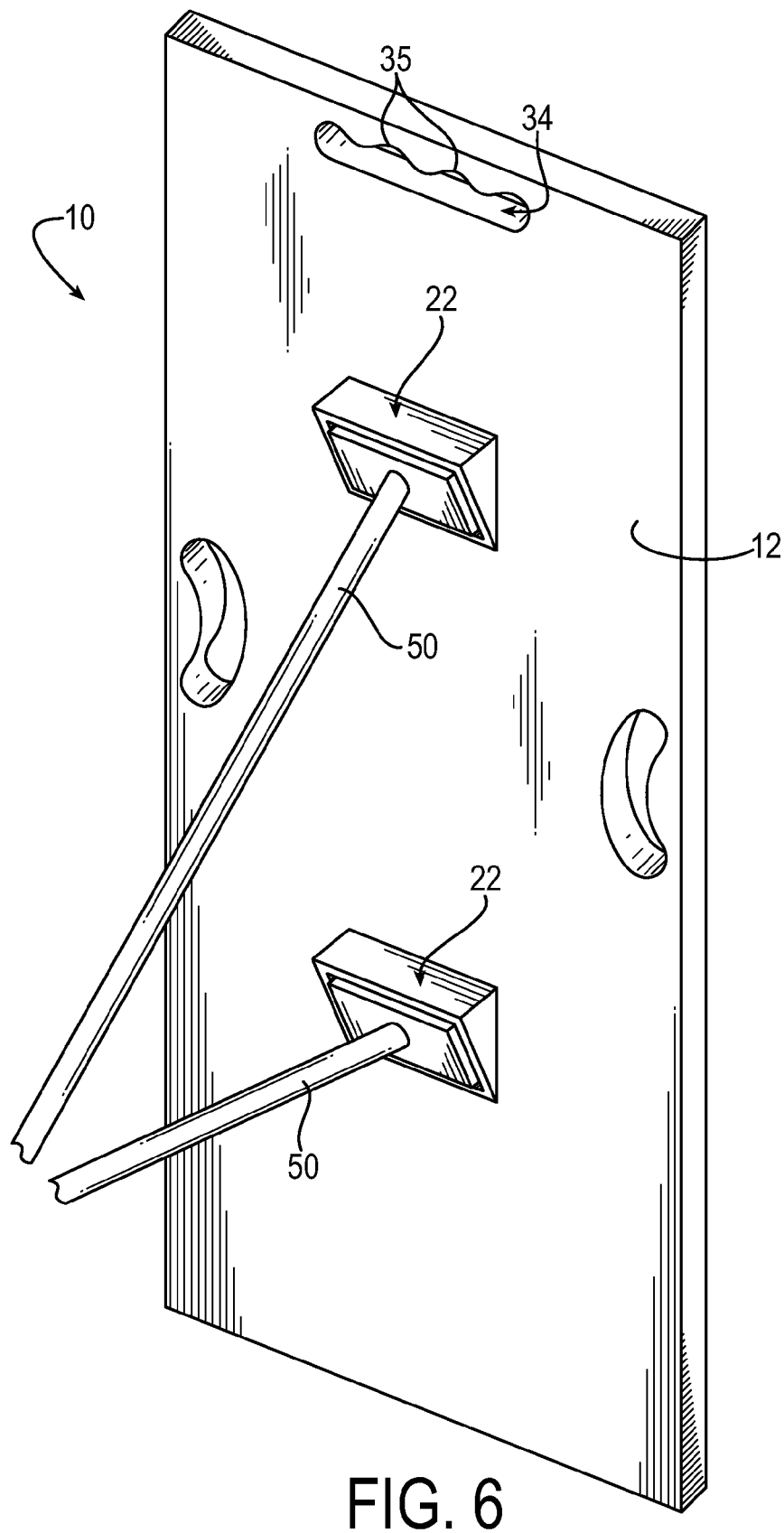
FIG. 6 is a partial elevational view of a securing wall system in use with one or more load bars.

Turning to FIG. 6, the wall system 10 is positioned relative to a palletized load and retained in position by one or more load bars 50 or other suitable support members, which engage the restraint receiving system(s) 22. As the wall system 10 is formed to have rigidity and strength, a single load bar 50 may be all that is necessary to secure the wall system 10 against materials stacked on a pallet, or a plurality of load bars and associated restraint receiving systems 22 may be used. Providing a plurality of restraint receiving systems 22 at different heights on the panel member 12 may allow use of a higher restraint receiving system 22 to secure an individual pallet with materials stacked high, by ensuring that the force applied to the panel member is at a higher point on the palletized materials to prevent shifting. A lower restraint receiving system 22 may be used in addition to an upper one, to apply more restraining force against the palletized goods, or may be used separately to secure a palletized load with materials stacked low, thus placing force upon and securing material that is placed lower on a pallet from shifting.

While principles and modes of operation have been explained and illustrated with regard to particular embodiments, it must be understood, however, that this may be practiced otherwise than as specifically explained and illustrated without departing from its spirit or scope.

What is claimed is:

1. A load securing wall system comprising:
    a panel member having a height and a width, and first and second sides, with the second side forming a support surface, the support surface defining a plane;
    the first side of the panel member including at least one integrated restraint receiving system;
    the at least one restraint receiving system including an angled support surface extending obliquely relative to the plane of the support surface, the at least one restraint receiving system to be engaged by a support member to maintain the support surface of the panel member against a side of a palletized load, and
    at least one foot member extending from the support surface to engage a portion of a pallet when the panel member is positioned against the palletized load.

2. The wall system of claim 1, wherein the panel member comprises first and second face walls, and a plurality of reinforcing structures extend between the first and second face walls or into engagement between the first and second face walls.

3. The wall system of claim 1, wherein the angled support surface is reinforced.

4. The wall system of claim 1, wherein the angled support surface is surrounded on at least two sides with a ridge portion.

5. The wall system of claim 1, wherein the panel member is formed by a plastic blow molding process to form first and second walls and a hollow core area.

6. The wall system of claim 1, wherein first and second walls of the panel member are formed to have a thickness to provide rigidity to the panel member.

7. The wall system of claim 1, wherein a plurality of restraint receiving systems are provided, and are positioned at higher and lower positions on the panel member.

8. The wall system of claim 1, wherein the width of the panel member is between 50 and 100 percent of the width of the pallet.

9. The wall system of claim 1, wherein the height of the panel member is substantially the height of an inside dimension of a mobile vehicle carrying the palletized load.

10. The wall system of claim 1, wherein the first side of the panel member includes at least two restraint receiving systems, with the at least two restraint receiving systems positioned at higher and lower positions on the first side of the panel member.

11. The wall system of claim 1, wherein the angled support surface is surrounded on at least two sides with a wall portion.

12. The wall system of claim 1, wherein the angled support surface is strengthened by making the surface thicker, or by a member formed to support the surface.

13. The wall system of claim 1, wherein the at least one restraint receiving system is positioned along approximately the center line of the width of the panel member.

14. The wall system of claim 1, wherein the height of the panel member is substantially the height of the palletized load on the pallet.

15. The wall system of claim 1, wherein a plurality of restraint receiving systems are provided.

16. The wall system of claim 1, wherein the height of the panel member is between 50 and 100 percent of the height of the palletized load.

17. The wall system of claim 1, wherein the at least one foot member dimensioned and positioned to allow for extending into a side portion of a pallet to provide support that opposes vertical movement of the wall system relative to the pallet.

18. The wall system of claim 1, wherein a plurality of foot members are provided.

19. The wall system of claim 1, further comprising a hole to allow hanging of the wall system.

20. The wall system of claim 1, wherein the wall system is substantially hollow between the first and second sides.

* * * * *